(12) United States Patent
Volponi (10) Patent No.: US 8,010,320 B2
(45) Date of Patent: Aug. 30, 2011

(54) REDUCING GAS TURBINE PERFORMANCE TRACKING ESTIMATION NON-REPEATABILITY

(75) Inventor: Allan J. Volponi, West Simsbury, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 11/601,213

(22) Filed: Nov. 17, 2006

(65) Prior Publication Data
US 2008/0120074 A1 May 22, 2008

(51) Int. Cl.
*G06F 19/00* (2011.01)
(52) U.S. Cl. ............ 702/185; 702/33; 701/100
(58) Field of Classification Search .......... 702/33–35, 702/179, 182, 183, 185, 190, 199; 701/100
See application file for complete search history.

(56) References Cited

U.S. PATENT DOCUMENTS

| | | | | |
|---|---|---|---|---|
| 5,105,372 | A | * | 4/1992 | Provost et al. ........... 702/185 |
| 5,144,595 | A | * | 9/1992 | Graham et al. ........... 367/135 |
| 5,340,987 | A | * | 8/1994 | Eckles et al. ........... 250/345 |
| 6,910,364 | B2 | * | 6/2005 | Girbig ........... 73/1.27 |
| 2002/0143477 | A1 | * | 10/2002 | Antoine et al. ........... 702/34 |
| 2004/0088100 | A1 | * | 5/2004 | Volponi ........... 701/100 |
| 2004/0153815 | A1 | * | 8/2004 | Volponi ........... 714/37 |
| 2006/0047403 | A1 | * | 3/2006 | Volponi et al. ........... 701/100 |
| 2006/0217870 | A1 | * | 9/2006 | Hoff et al. ........... 701/100 |

OTHER PUBLICATIONS

Volponi et al., "A bootstrap data methodology for sequential hybrid engine model building" 2005 IEEE Aerospace Conference Mar. 5-12, 2005 pp. 3463-3471.*
Brotherton et al., "eSTORM: Enhanced self tuning on-board real-time engine model". 2003 IEEE Aerospace Conference Proceedings vol. 7, Mar. 8-15, 2003 pp. 3075-3086.*
DeWallef, "Application of the Kalman filter to health monitoring of gas turbine engines: a sequential approach to robust diagnosis." 2005.*
Volponi et al., "Development of an Information Fusion System for Engine Diagnosis and Health Management", NASA/TM—2004-212924. Feb. 2004.*
Brotherton et al., "eSTORM: Enhanced Self Tuning On-board Real-time Engine Model", Proceedings, 2003 IEEE Aerospace Conference, Mar. 8-15, 2003.*

* cited by examiner

*Primary Examiner* — Jeffrey R West
(74) *Attorney, Agent, or Firm* — Bachman & LaPointe, P.C.

(57) ABSTRACT

The invention increases the fidelity of gas turbine engine module performance estimates that in turn enhance performance tracking and visibility. The methodology obviates input signal filtering since filtering may mask the onset and detection of a rapid measurement shift indicative of serious engine performance issues. The invention supports trend detection processes for timely detection, isolation and alerting of performance and engine system related faults.

16 Claims, 6 Drawing Sheets

REDUCING GAS TURBINE PERFORMANCE TRACKING ESTIMATION NON-REPEATABILITY

BACKGROUND OF THE INVENTION

The invention relates generally to the field of gas turbine engine modeling. More specifically, the invention relates to methods and systems that mitigate the effects of input measurement variability on long-term gas turbine engine module performance tracking.

The area of gas turbine performance diagnostics concerns tracking changes in engine module performance measures, such as efficiency and flow parameters, as the engine deteriorates over time. The engine modules that are tracked are typically the compressor and turbine elements of an engine. For example, for a two-spool turbofan engine, the modules would generally be the fan, the low pressure compressor (LPC), the high pressure compressor (HPC), the high pressure turbine (HPT), and the low pressure turbine (LPT). The primary sources of information driving this methodology are operational measurements acquired along an engine's gas path, such as temperatures, pressures, speeds, etc. Tracking fleets of engines across a wide customer/aircraft base offers the added complexity that the measured parameters are affected by different instrumentation calibration and recording fidelity that proves to be non-repeatable across installations.

A successful engine performance diagnostic methodology must include a provision for mitigating measurement non-repeatability. Scatter in measured signal parameters produces anomalies in calculated estimates of engine module performance. Since a performance tracking process must address slow, long-term performance degradation as well as fast, short-term performance degradation (fault anomaly detection), filtering the input data streams is not an acceptable means of reducing dispersion in performance estimates.

One approach to estimating gas turbine engine module performance changes from gas path measurement data uses a linear estimation process modeled after a Kalman filter. The changes are calculated as percent deltas (% Δ) from a known reference or baseline condition, typically a production level engine. Gas path parameter measurements, such as temperatures, pressures, speeds, etc. are corrected and normalized for flight conditions, and compared to the reference baseline to calculate a percent of point changes for each measured parameter. The attendant changes in engine module performance (delta efficiency and flow parameters) are calculated through a series of calculations that involve the calculated percent deltas, known measurement non-repeatabilities, and engine, sensor, and engine system fault influence characteristics.

Engine module performance estimation and tracking has evolved over the last three decades and has produced numerous methods to enable this activity. Some of these methods are model based and make use of linear engine models and Kalman filters for estimating performance changes. Other methods depend entirely on empirical relationships derived from observed engine test and engine flight data. Yet others consist of physics-based methods, empirical methods, and hybrid combinations of the two. The latter methods make use of techniques that include artificial neural networks (ANNs), fuzzy logic, Bayesian belief networks, support vector machines (SVMs), probabilistic neural networks, genetic algorithms, and the like. Combinations of both physics-based model approaches and empirical approaches to form hybrid model methods have also been used.

No matter what method is employed to estimate engine performance changes, variance and noise manifest in the gas path signal data streams produce undesirable characteristics in associated engine module output. In gas turbine monitoring applications, it is not uncommon to have noise present in the input gas path parameter delta input data streams that induce unacceptable scatter in the performance estimate outputs.

The noise that manifests itself in gas path signal measurement delta data streams is due to sensor instrument non-repeatability, reference model errors, flight conditions, ambient variability, altitude (Reynold's) effects, and others. It is also of interest to detect, and subsequently isolate, engine system faults, sensor faults, and anomalous engine operation hidden in rapid measurement parameter delta shifts unlike gradual deterioration that introduces a more gradual overall trend over time. Filtering an input measurement delta parameter data stream (to reduce variability impact on the output) may mask anomalous behavior and make detection of anomalies difficult.

What is needed is an efficient means to reduce estimation non-repeatability and increase measurement fidelity while maintaining unfiltered input data streams that supports early anomaly detection.

SUMMARY OF THE INVENTION

Although there are various methods and systems modeling gas turbine engine operational behavior, such models are not completely satisfactory. The inventor has discovered that it would be desirable to have methods and systems that enable early anomaly detection while mitigating the effects of input measurement variability on long-term engine module performance tracking.

The invention increases the fidelity of gas turbine engine module performance estimates that in turn enhance performance tracking and fault visibility. The measurements that are typically monitored are in an engine's gas path and comprise rotational component speeds, temperatures, pressures and flows.

The methodology obviates input signal filtering since filtering may mask the onset and detection of a rapid measurement shift indicative of serious engine performance issues. The attendant changes in engine module performance (delta efficiency and flow parameters) are calculated from observed engine parameter changes from a reference which may be an engine model representing a production standard engine. The invention supports trend detection processes for timely detection, isolation and alerting of performance and engine system related faults.

One aspect of the invention provides a method for mitigating the effects of gas turbine engine gas path measurement variability. Methods according to this aspect of the invention preferably start with comparing gas path measurement data to a reference model wherein differences between the gas path data and the reference model are output as percent deltas, performing a gas path analysis on the percent deltas and a priori estimated percent deltas, wherein the gas path analysis outputs estimated performance percent deltas of the gas path measurements, delaying the estimated performance percent deltas, filtering the delayed, estimated performance percent deltas, wherein the filtered estimated performance percent deltas are a priori estimated performance percent delta values, and outputting estimated performance percent deltas of the gas turbine engine gas path measurement.

Another aspect of the invention is a system for mitigating the effects of gas turbine engine gas path measurement variability. Systems according to this aspect comprise a system input for coupling with a gas path percent delta data measurement, an engine performance fault estimator having first and second inputs, the first input coupled to the system input, the engine performance fault estimator configured to perform a gas path analysis on the percent delta data and a priori estimated percent delta data, wherein the gas path analysis outputs estimated performance percent delta data of the gas path measurement, a delay coupled to an output of the engine performance fault estimator, the delay configured to delay the estimated performance percent delta data by a predefined time period, a filter coupled to an output of the delay, the filter configured to filter the delayed, estimated performance percent delta data, the filtered estimated performance percent delta data is the a priori estimated performance percent delta data which is output and coupled to the second engine performance fault estimator input, and a system output coupled to the engine performance fault estimator for outputting estimated performance percent delta of the gas turbine engine gas path measurement.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and system may be implemented in software or hardware.

The invention is a modular framework and may be deployed as software as an application program tangibly embodied on a program storage device. The application code for execution may reside on a plurality of different types of computer readable media known to those skilled in the art.

Embodiments of the invention provide methods and systems that mitigate the effects of input measurement variability on long-term gas turbine engine module performance tracking. The invention employs a predictor-corrector estimation process.

The predictor may be performance estimates from the previous data sample processed. In this manner, the estimates at time k−1 are a priori information for processing the data at time k. Filtering the a priori estimates through an averaging process, such as an exponential average, reduces the overall non-repeatability in the estimation process of the incoming data at the next time step. One methodology uses a predictor-corrector, however, other analysis methods may be used.

Figure 1:
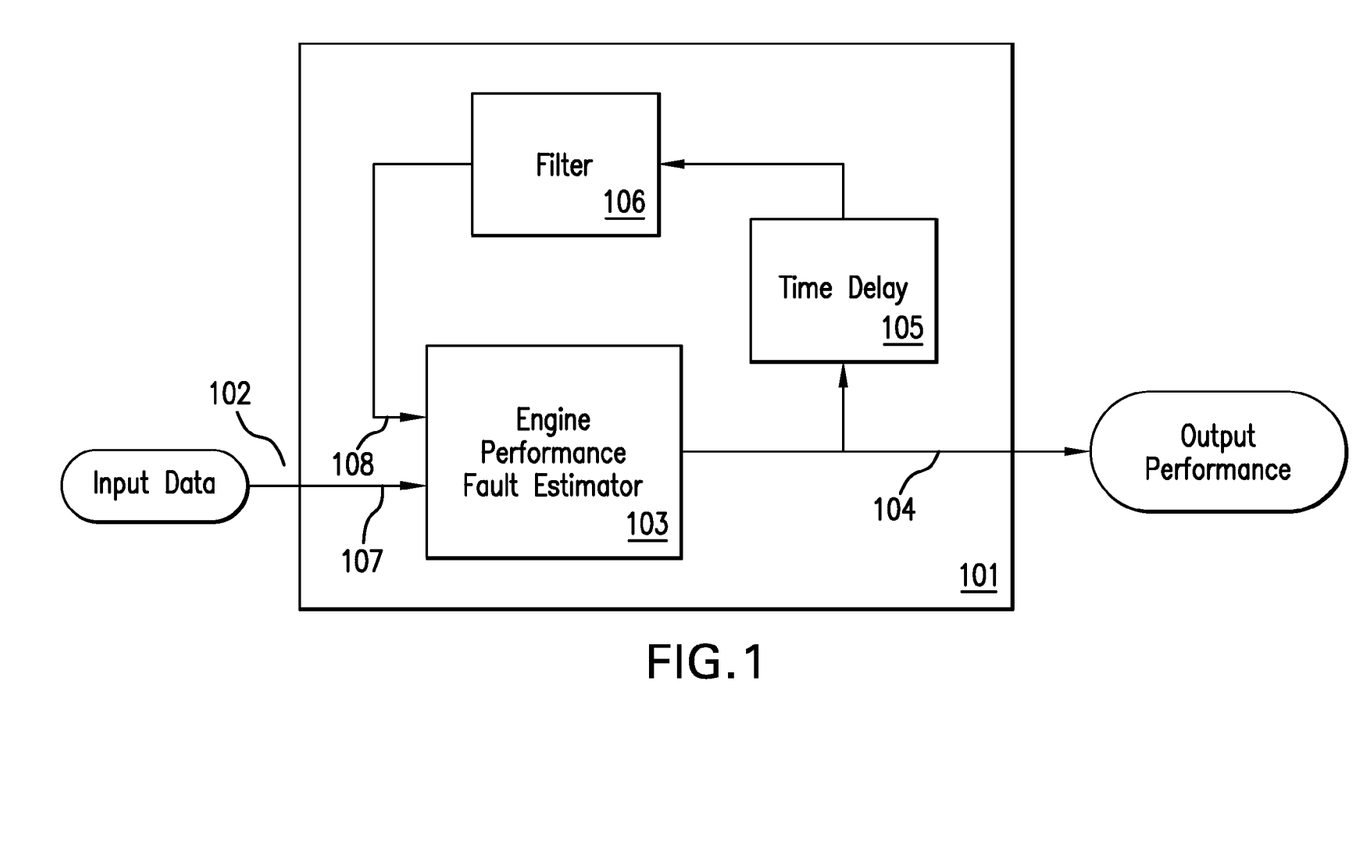
FIG. 1 is an exemplary system that increases the fidelity of gas turbine engine module performance estimates.
Figure 2:
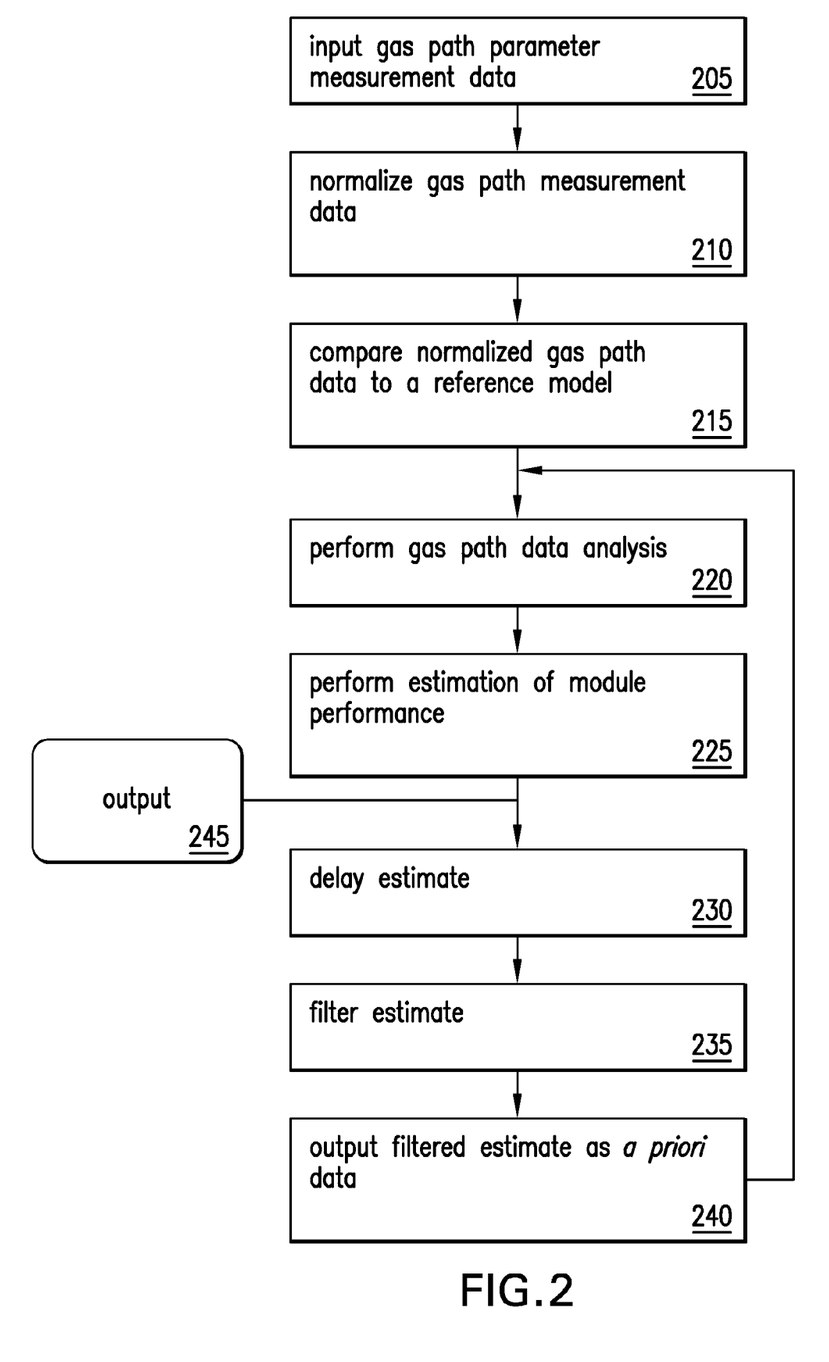
FIG. 2 is a block diagram of an exemplary estimate enhancement method.

Shown in FIGS. 1 and 2 is a system 101 and method employing a predictor-corrector estimation process. The system 101 comprises a system data input 102, an engine performance fault estimator 103 having a data input 107 and an a priori data input 108, a sample delay 105, a filter 106, and a system output 104.

Gas path measurement data samples enter 102 the system at time k. The data may take the form of percent measurement deltas, or residuals, of rotational speeds, temperatures, pressures, and flows acquired from an engine's gas path during operation (step 205). The percent deltas may be pre-processed, where the raw gas path measurement data is corrected and normalized for ambient flight and operating conditions (step 210). The normalized gas path data is compared to a reference model of the engine that represents nominal performance (step 215).

The engine performance fault estimator 103 performs a gas path analysis (step 220) and in one embodiment may be a predictor-corrector calculation. The engine performance fault estimator 103 outputs 104 estimated percent delta performance measures in the form of efficiency and flow parameters (step 225). A zero percent delta output indicates nominal behavior, a negative percent delta output indicates deterioration, and a positive percent delta output indicates improvement (i.e. an overhaul or repair).

In a predictor-corrector formulation, the performance estimate at time k, $\hat{x}_k$, is a function of a previous estimate at time k−1, $\hat{x}_{k-1}$, and the current measurement data sample at time k, $z_k$, $$\hat{x}_k = f(\hat{x}_{k-1}, z_k). \tag{1}$$

The previous estimate, $\hat{x}_{k-1}$, or a function of it, serves as the basis for the predictor.

The residual difference $z_k - \hat{z}_k$ formed from the current data sample, $z_k$, and the data expected to be observed based on the prediction, $\hat{z}_k = g(\hat{x}_{k-1})$, forms the basis for the corrector where g is a function.

The engine performance fault estimator 103 configured as a predictor-corrector has two inputs. The first input 107 is for incoming, current percent delta data samples. The second input 108 accepts a form of a priori information as the predictor.

The predictor data 108 takes the form of a filtered 106 sample derived from a previous estimated performance percent delta 104. The delay register 105 (step 230) stores the last estimated performance percent delta 104 (at time k−1) that enters the filter 106. The recursive loop defined by the time delay 105 and filter 106 reduces variability in the a priori estimated performance percent deltas 104 (steps 235, 240).

The filter 106 may be of many forms, for example, a filter may be an exponential average filter. The exponential moving average, or exponentially weighted moving average applies weighting factors which decrease exponentially. The weighting for each sample decreases by a factor, or percentage, on the one before it and is defined by $$\hat{x}_k^{a\,priori} = a\hat{x}_{k-1}^{a\,priori} + (1-a)\hat{x}_{k-1}, \text{ or rewritten as} \quad (2)$$

$$\hat{x}_k^{a\,priori} = \hat{x}_{k-1} + a(\hat{x}_{k-1}^{a\,priori} - \hat{x}_{k-1}), \quad (3)$$

where, a is an exponential averaging constant, or smoothing factor selected by a user, $\hat{x}_{k-1}^{a\,priori}$ is the previous exponential average, and $\hat{x}_{k-1}$ is a delayed percent performance measure output 104. The engine performance fault estimator 103 outputs 104 at time k, $\hat{x}_k$, which is a function of the percent delta input 102, $z_k$, and the delayed 105 and filtered 106 a priori estimate, $\hat{x}_{k-1}^{a\,priori}$, which is the present exponential average (step 245). The a priori superscript indicates a prior estimate in the estimating process. A new average at time k is a weighted sum of the previous average at time k−1 and the new data sample at time k.

Figure 3A:
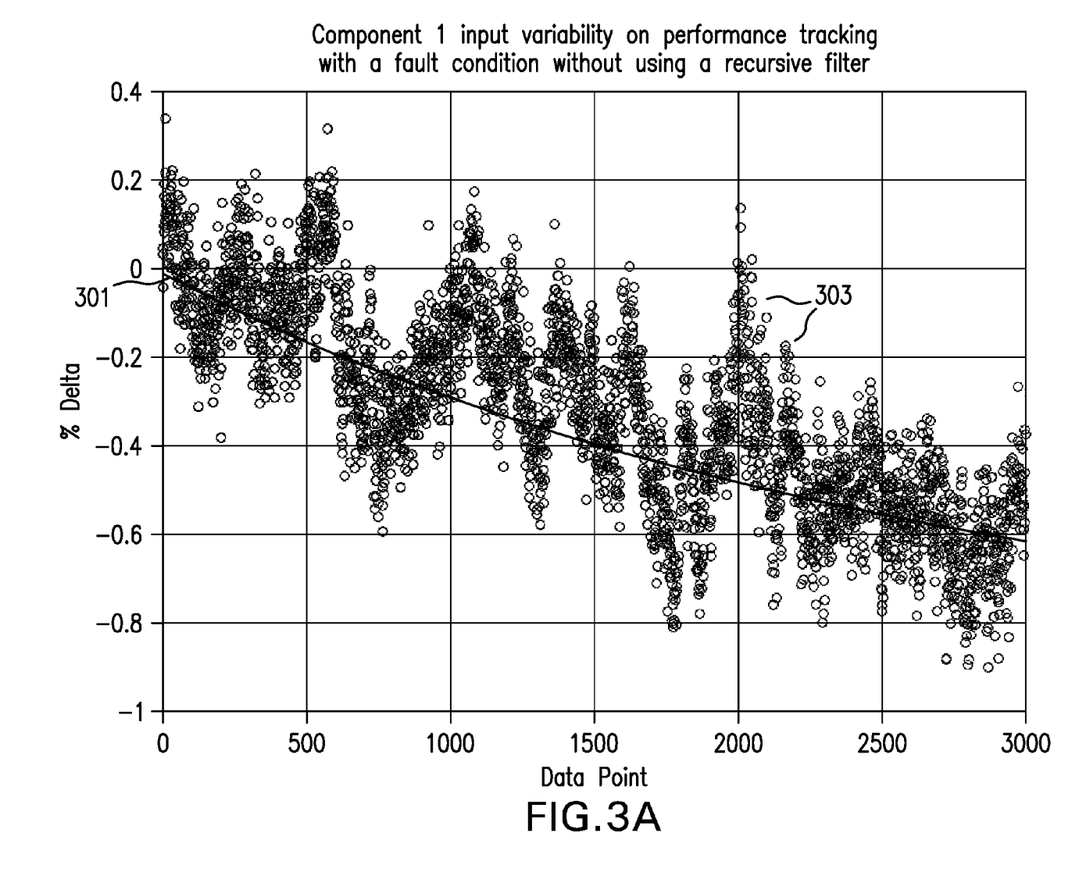
FIG. 3A is an exemplary plot of component_1 input variability on performance tracking in conjunction with a fault condition without using a recursive filter.
Figure 3B:
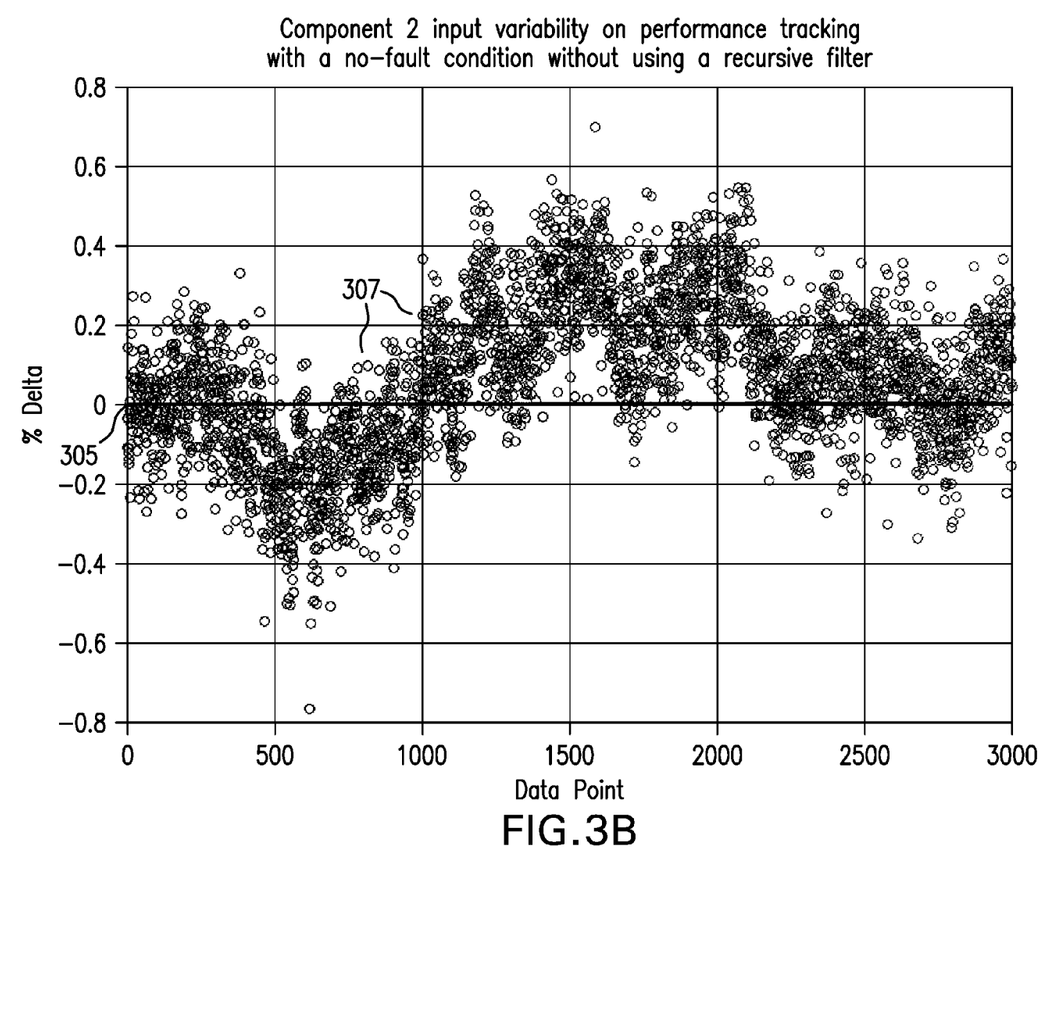
FIG. 3B is an exemplary plot of component_2 input variability on performance tracking in conjunction with a no-fault condition without a recursive filter.

Shown in FIGS. 3A and 3B are plots depicting an output of a common performance estimator using a predictor-corrector. FIG. 3A shows a gas path performance parameter, component_1, that is an efficiency delta experiencing degradation. The solid line 301 is an implanted fault (degradation). The circles 303 represent a time series of estimates of the performance fault estimated from a series of noisy measurement deltas representing the fault. The variation induced in the estimates is evident and exhibits a cyclical pattern about the fault line. The induced variations manifest themselves as peak to peak, overall, and cyclical perturbations. Noise introduced in the input parameters causes the variations.

FIG. 3B shows the results of a second component, component_2, fault estimate that performed nominally during the same test. The solid line 305 at zero percent delta indicates that component_2 had nominal performance due to 0 percent delta's from nominal. The circles 307 indicate the effect on the estimates of component_2 from the variability of the input data described above.

Figure 4A:
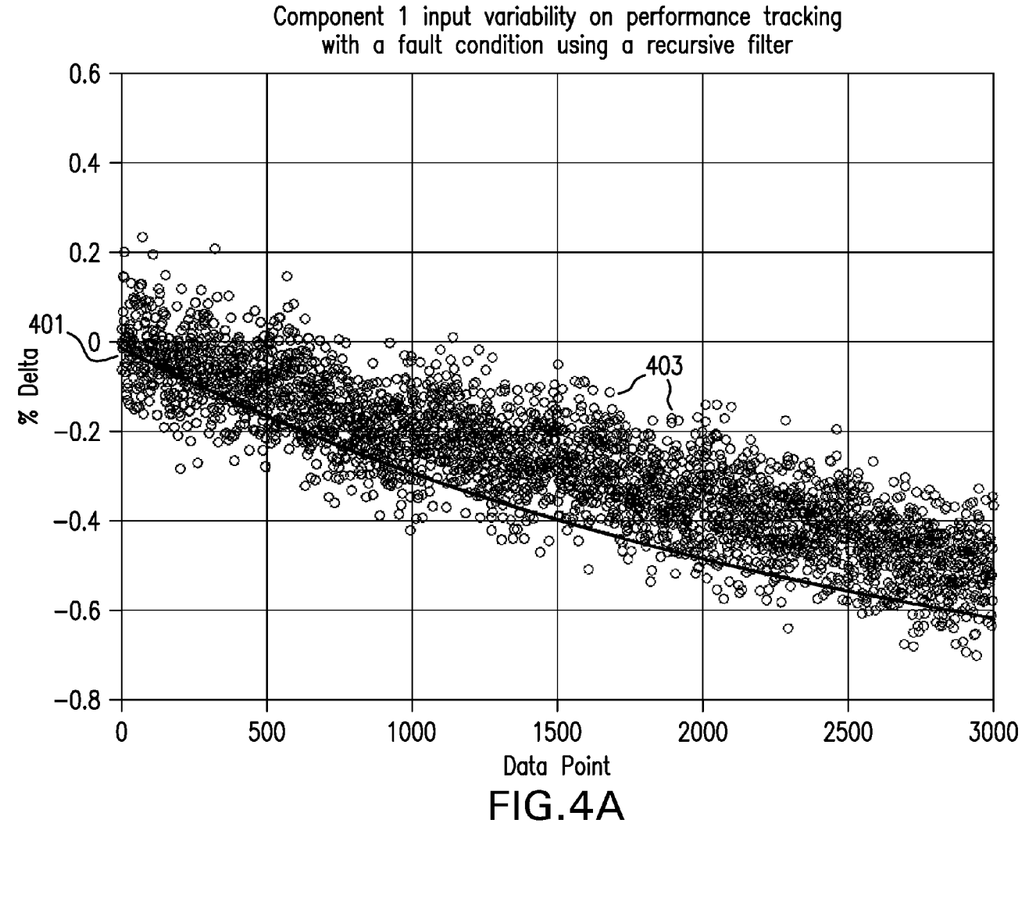
FIG. 4A is an exemplary plot of component_1 input variability on performance tracking in conjunction with a fault condition employing a recursive filter.
Figure 4B:
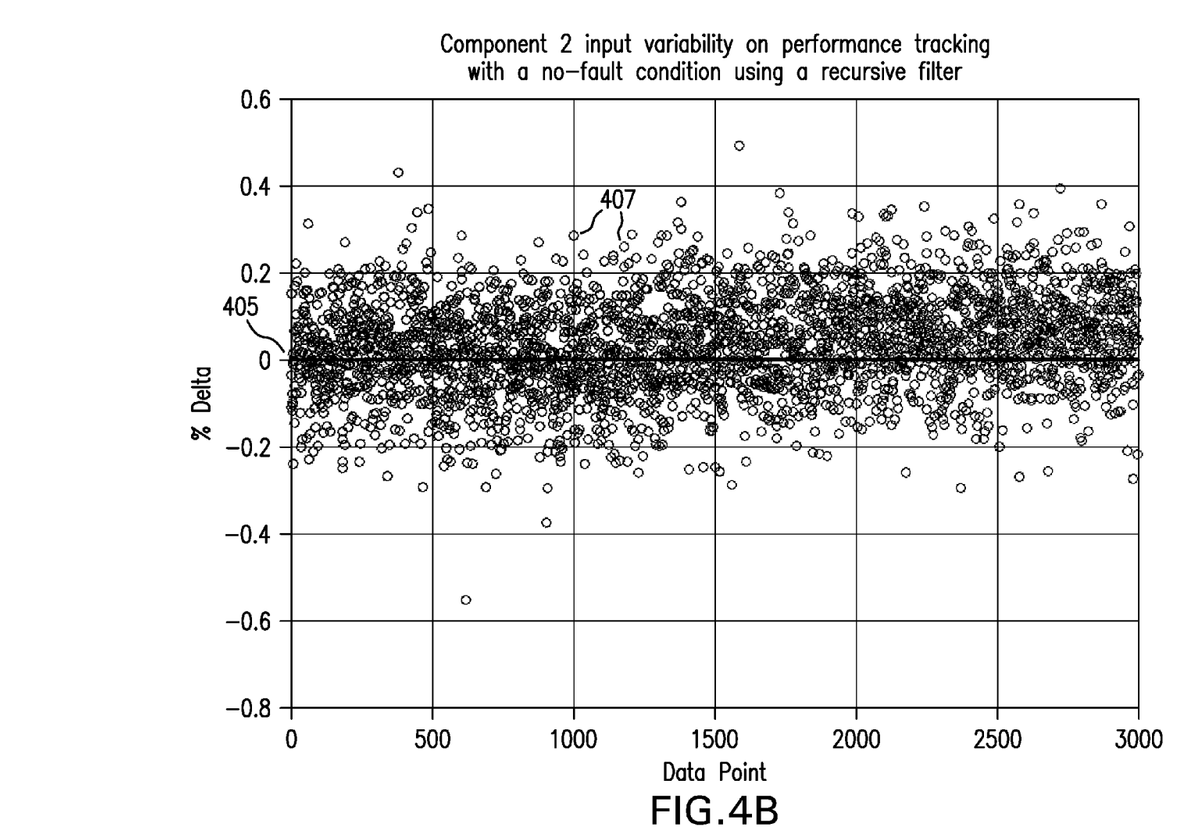
FIG. 4B is an exemplary plot of component_2 input variability on performance tracking in conjunction with a no-fault condition employing a recursive filter.

FIGS. 4A and 4B show the same performance parameters for component_1 and component_2, respectively, when process through the invention 101. In FIG. 4A, the solid line 401 is an implanted fault (degradation) and the circles 403 represent a time series of estimates from a series of noisy measurement deltas representing the fault. In FIG. 4B, the solid line 405 at zero percent delta indicates that component_2 had nominal performance and the circles 407 indicate the effect on the estimates of component_2 from the variability of the input data. The cyclical behavior has been mitigated, reducing the overall variability in the output due to using filtered 106 a priori estimates in the engine performance fault estimator 103.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for mitigating effects of gas turbine engine gas path measurement variability comprising:
    comparing gas path measurement data to a reference model and outputting differences between the gas path measurement data and said reference model as percent deltas;
    performing a gas path analysis using a predictor-corrector function on said outputted percent deltas and a priori estimated performance percent deltas, and outputting estimated performance percent deltas of the gas path measurement data;
    time delaying said estimated performance percent deltas using a delay register which stores a most recent set of said estimated performance percent deltas;
    forming said a priori estimated performance percent deltas by filtering said time delayed, estimated performance percent deltas using an exponential average filter;
    said time delaying and filtering steps reducing a variation in estimated performance percent deltas, said variation comprises noise;
    inputting the a priori estimated performance percent deltas to a fault estimator along with data input so as to form a new set of estimated performance percent deltas based on the a priori estimated performance percent deltas and the data input; and
    outputting said new set of estimated performance percent deltas.

2. The method according to claim 1 wherein said predictor-corrector function calculates an estimated performance percent delta for each said percent delta and each said a priori estimated performance percent delta.

3. The method according to claim 2 wherein said a priori estimated performance percent delta is a predictor input to said predictor-corrector function.

4. The method according to claim 3 wherein a residual difference between a current percent delta and said predictor input is calculated as a corrector function.

5. A system for mitigating effects of gas turbine engine gas path measurement variability comprising:
    means for comparing gas path measurement data to a reference model and for outputting differences between gas path measurement data and a reference model as percent deltas;
    means for generating a priori estimated performance percent deltas;
    an engine performance fault estimator which receives said percent deltas and said a priori estimated performance percent deltas, said engine performance fault estimator configured to perform a gas path analysis using a predictor-corrector function on said percent deltas and said a priori estimated performance percent deltas, wherein said engine performance fault estimator outputs estimated performance percent delta data of a gas path percent delta data measurement;
    a recursive loop for reducing variability in the a priori estimated performance deltas, said recursive loop including a time delay coupled to an output of said engine performance fault estimator, said time delay configured to delay said estimated performance percent delta data by a predefined time period;
    said recursive loop further including said means for generating a priori estimated performance percent deltas;
    said means for generating a priori estimated performance percent deltas comprising an exponential average filter coupled to an output of said time delay, said filter configured to filter said delayed estimated performance percent delta data, and to form an output which is said a priori estimated performance percent deltas; and
    a system output coupled to said engine performance fault estimator output configured to output said estimated performance percent delta data.

6. The system according to claim 5 wherein said predictor-corrector function is configured to calculate an estimated performance percent delta for each said percent delta and each said a priori estimated performance percent delta.

7. The system according to claim 6 wherein said a priori estimated performance percent deltas is a predictor input to said predictor-corrector function.

8. The system according to claim 7 wherein a residual difference between a current percent delta data measurement and said predictor input is calculated as a corrector function.

9. The system according to claim 5 wherein said predefined time period is the time from one estimated performance percent delta output value to the next estimated performance percent delta output value.

10. The system according to claim 5 wherein said filter exponential average is defined by a predefined smoothing factor $\alpha$.

11. The system according to claim 5 wherein said filter applies weighting factors which decrease exponentially.

12. A method for mitigating effects of sampled signal measurement variability comprising:
providing sampled signal measurement data relating to rotational speeds, temperatures, pressures, and flows acquired from an engine gas path during operation;
correcting and normalizing said sampled signal measurement data for ambient flight and operating conditions;
comparing said normalized sampled signal measurement data to a reference model of said engine wherein differences between the normalized sampled signal measurement data and said reference model are output as percent deltas;
performing an analysis on said percent deltas and a priori estimated performance percent deltas using an estimator which uses predictor-corrector function and outputting estimated performance percent deltas of the sampled signal measurement data from said estimator;
time delaying said estimated performance percent deltas using a delay register which stores a set of most recent estimated performance percent deltas;
filtering said time delayed, estimated performance percent deltas to form said a priori estimated performance percent deltas;
reducing a variation in estimated performance percent deltas using said filtering step, said variation comprises noise; and
inputting said a priori estimated performance percent deltas into said estimator.

13. The method according to claim 12 wherein said predictor-corrector function calculates an estimated performance percent delta for each percent delta and each a priori estimated performance percent delta.

14. The method according to claim 13 wherein said a priori estimated performance percent delta is a predictor input to said predictor-corrector function.

15. The method according to claim 14 wherein a residual difference between a current percent delta and said predictor input is calculated as a corrector function.

16. The method according to claim 15 wherein said filtering is performed using an exponential average time series.

* * * * *